No. 821,248. PATENTED MAY 22, 1906.
C. E. LIPE & A. T. BROWN.
CHANGEABLE GEAR.
APPLICATION FILED JUNE 15, 1894.

2 SHEETS—SHEET 1.

Witnesses,
Sidney P. Hollingsworth
C. C. Brudine

Charles E. Lipe,
Alexander T. Brown,
Inventors,
by Dodge Sons,
Attys.

No. 821,248. PATENTED MAY 22, 1906.
C. E. LIPE & A. T. BROWN.
CHANGEABLE GEAR.
APPLICATION FILED JUNE 15, 1894.
2 SHEETS—SHEET 2.
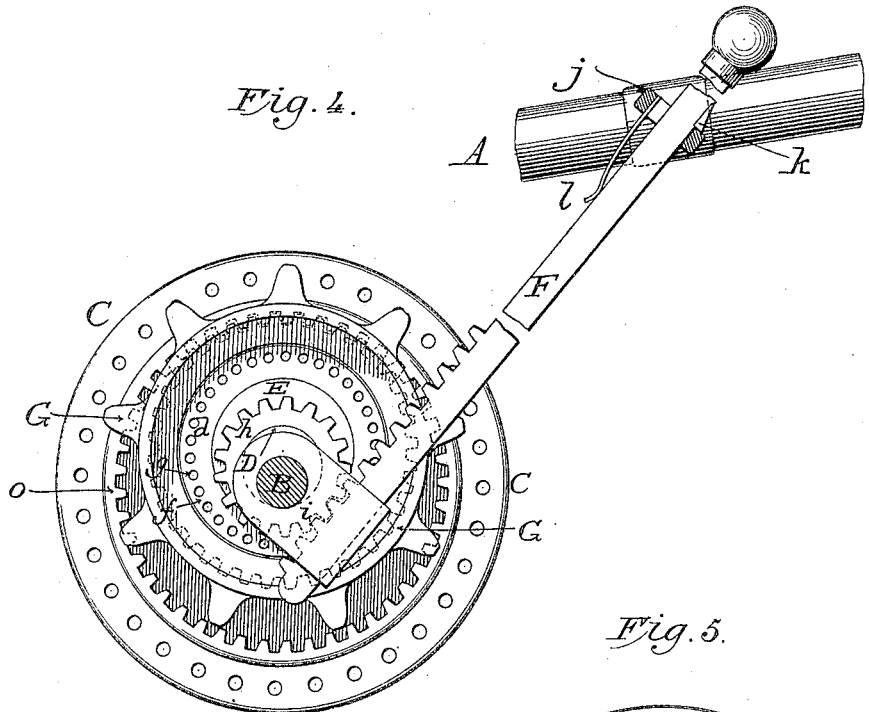
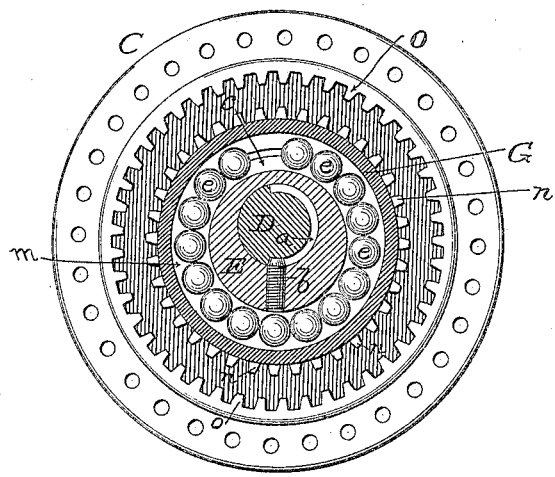
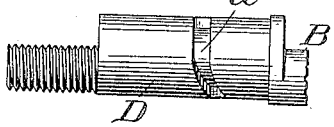
Charles E. Lipe,
Alexander T. Brown,
Inventors,

# UNITED STATES PATENT OFFICE.

CHARLES E. LIPE AND ALEXANDER T. BROWN, OF SYRACUSE, NEW YORK.

CHANGEABLE GEAR.

No. 821,248.   Specification of Letters Patent.   Patented May 22, 1906.

Application filed June 15, 1894. Serial No. 514,661.

*To all whom it may concern:*

Be it known that we, CHARLES E. LIPE and ALEXANDER T. BROWN, citizens of the United States, residing at Syracuse, in the county of Onondaga and State of New York, have invented certain new and useful Improvements in Changeable Gear, of which the following is a specification.

This invention relates to changeable gear for bicycles and other machines; and it consists in certain novel features and combinations hereinafter set forth and claimed.

Figure 1:
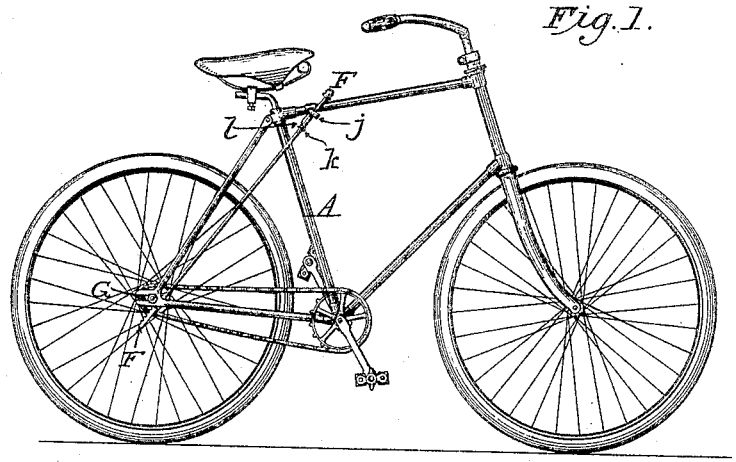
Figure 2:
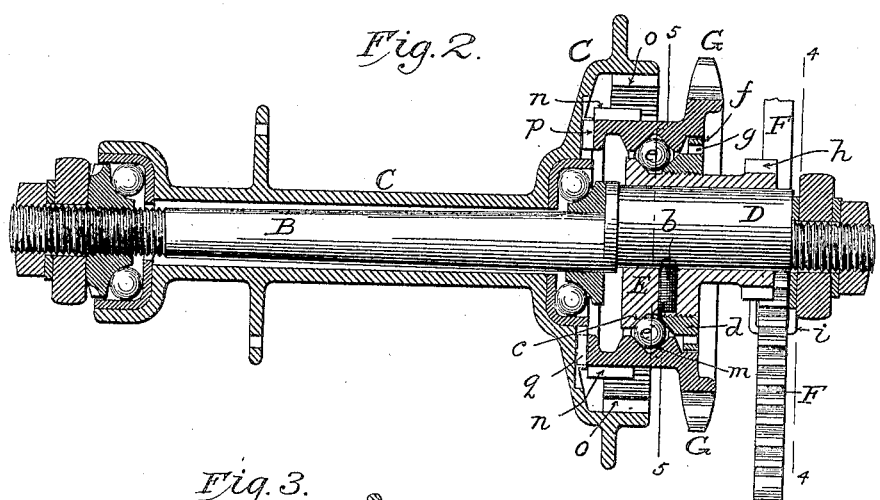
Figure 3:
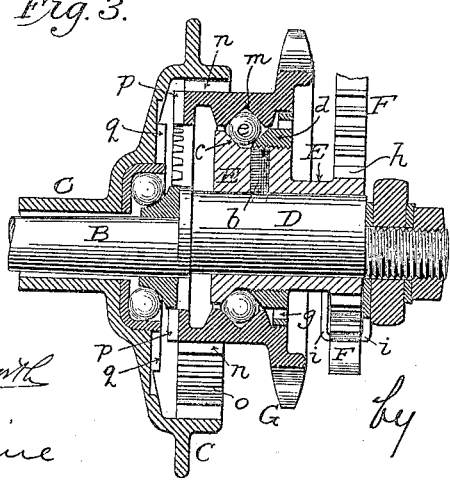

In the drawings, Figure 1 is an elevation of a bicycle having the improved gear applied thereto; Fig. 2, a longitudinal sectional view through the rear hub and gear; Fig. 3, a similar sectional view through the gear with the parts in a different position; Fig. 4, a vertical sectional view on the line 4 4 of Fig. 2; Fig. 5, a similar view on the line 5 5 of Fig. 2, and Fig. 6 a side elevation of the end of the axle.

A indicates the main frame of the machine, in which the rear axle or shaft B is firmly clamped, and C is the hub of the rear wheel, which is adapted to turn upon or relatively to the said shaft or axle.

Shaft or axle B is provided with an eccentric or eccentric end portion D, having a cam-groove $a$, Figs. 5 and 6, upon which is mounted an eccentric sleeve E, having a pin, stud, or screw $b$ to enter the cam-groove, the eccentricity of the sleeve being equal to that of the shaft. Sleeve E is provided with an inclined circumferential flange $c$ and with an adjustable beveled collar $d$, Figs. 2 and 3, which form a runway or seat for the balls $e$, the said collar being flanged, as at $f$, and provided with holes $g$, Figs. 2, 3, and 4, in order that it may be adjusted or removed. At its outer end the sleeve E is provided with or fashioned into a pinion $h$, which, as shown in Figs. 2, 3, and 4, is concentric with the outer end of the shaft, and said pinion is engaged by a reciprocating rack or rack-bar F, whereby the sleeve may be turned or rotated. This rack-bar is supported at its lower end and held in engagement with the pinion by means of a clip $i$, carried by the frame, and passes at its upper end through an eye $j$, secured to the frame within reach of the operator. Bar F is provided with a lug $k$, which is held in engagement with the upper face of the eye by means of a spring $l$, as in Fig. 4, the eye being of such a width, however, that when the bar is moved backward against the spring it may, together with its lug, pass downward through the eye and in thus moving longitudinally effect a rotation of the eccentric sleeve. Other means may obviously be used to hold the rack-bar in its different positions without departing from the present invention.

Encircling the eccentric portion of sleeve E is a hollow sprocket-wheel G, which is provided internally with a V-groove $m$ to receive the balls $e$ and externally with gear-teeth $n$, which latter are adapted to be brought into engagement with the internal gear $o$, formed upon or secured to one end of the hub under certain conditions.

When the eccentric portion of sleeve E is above the shaft, Figs. 3 and 4, the gear-teeth on the sprocket will engage those on the hub; but when the eccentric portion of the sleeve is thrown below the shaft the gear-teeth on the sprocket will be carried out of engagement with those on the hub, as shown in Figs. 2 and 5, the rocking or rotating of the sleeve being effected through the rack F and pinion $h$, as before described. When the sleeve E is turned or rotated to disengage the gear-teeth, as just described, it is also moved inward upon the shaft by reason of the engagement of its pin or screw $b$ with the cam-slot $a$, thereby carrying its clutch-teeth $p$ into engagement with the corresponding clutch-teeth $q$, formed on the hub, as shown in Figs. 2 and 3, thereby clutching the sprocket-wheel rigidly to the hub and causing them to rotate together and at the same speed.

The operation is as follows: When it is desired to have a high speed, the rack-bar F is moved downward, thereby rotating the eccentric sleeve E in such direction, Figs. 2 and 5, as to throw it out of gear with the gear on the hub and connect or clutch it with the hub proper, the cam-slot $a$ and pin $b$ effecting the sliding movement of the sleeve and also limiting the rotary movement. The sprocket being thus clutched to the hub will rotate upon its sleeve and turn the hub at a speed dependent upon the proportions of the sprocket G and the sprocket on the pedal-shaft and just as though the sprocket were formed upon the hub. When, however, lower speed and greater power are required, the rack-bar F will be moved upward and will thereby turn the eccentric sleeve to the position shown in Figs. 3 and 4, but in thus rotating through an arc of one hundred and eighty degrees (or more or less, according to the throw required) it will, by reason of the cam-slot $a$ and pin $b$, be unclutched from the hub and thrown into gear with the latter. Now when the sprocket-wheel G is put in motion by the chain it will rotate upon or about its sleeve E upon the balls $e$ and impart a slower rotation to the hub, as will be readily understood. The speed and power under this adjustment will be governed or determined by the ratio or proportions of the two gears $n$ $o$.

While the present invention is designed more particularly for use upon bicycles and similar vehicles or machines, it is obvious that it can be employed in connection with other machinery, the part C being fashioned to adapt it to the purposes to which the invention is applied.

It is not the intention to restrict the invention to the precise construction illustrated in the drawings, which is but one form or embodiment of the invention, but to include and cover any sprocket-wheel which is adapted to be rigidly clutched to the hub or other part to be moved or to be unclutched therefrom and thrown into gear therewith, whereby two different speeds may be imparted to the hub or part to be rotated, according to the relative positions of the said sprocket-wheel and hub.

It will be noticed that the lateral or axial movement of the combined sprocket and gear wheel G is very slight, not being sufficient to carry the pinion $h$ out of gear with the rack F nor sufficient to interfere in the least with the proper working of the sprocket-chain.

The balls $e$ may be omitted and the sprocket-wheel arranged to bear directly upon the periphery of the eccentric sleeve E, or, if desired, rollers may be substituted for the balls. The construction shown is preferred, however, as it produces an easy-running and practically dustproof bearing for the sprocket-wheel. It is to be understood, further, that in lieu of the reciprocating rack-bar any other mechanical device may be arranged to actuate the eccentric sleeve; but the construction shown is preferred because of its simplicity and the ease with which it may be operated.

What is claimed as new is—

1. In combination with a fixed axle having an eccentric extension; a wheel-hub encircling the body of the axle and provided with a clutch member; a rotatable member mounted on the eccentric extension of the axle and provided with an eccentric portion; a combined sprocket and gear carried by the eccentric portion of said rotatable member, formed with a clutching member, and movable at right angles to and also in the direction of the length of the axle; and means for so moving the combined sprocket and gear lengthwise of the axle; whereby it may be thrown into and out of gear with or clutched to and unclutched from the wheel-hub.

2. In combination with a fixed axle having an eccentric extension, a member to be driven, mounted loosely upon said axle and having a clutching portion; a combined sprocket and gear having a clutch member or portion adapted to clutch with the member to be driven; an eccentric sleeve mounted upon the eccentric extension of the axle and carrying the combined sprocket and gear; a cam connection between said sleeve and the extension on which it is mounted; and means for rotating said sleeve, such rotation serving to carry the combined sprocket and gear radially into and out of mesh with the member to be driven, and to move it longitudinally out of and into clutching relation with said member, the meshing and clutching relations occurring in alternation.

3. In combination with an axle having an eccentric portion; a hub thereon provided with a gear and with a clutch member; an eccentric sleeve mounted upon the eccentric portion of the axle; a combined sprocket and gear mounted upon the sleeve and provided with a clutch member; and means for actuating the sleeve, whereby the combined sprocket and gear may be brought into a position concentric with the axle and clutched directly to the hub, or into a position eccentric to the axle and thrown into gear with the hub.

4. In combination with an axle having an eccentric portion; a hub provided with gear-teeth and clutch-teeth and concentric with the body of the axle; a combined sprocket and gear wheel provided with clutching-teeth; an eccentric loosely encircling the eccentric portion of the axle, constituting a bearing for the combined sprocket and gear, and serving to move the latter at right angles to the axle to throw it directly into and out of gear with the hub; and means for moving the combined sprocket and gear longitudinally of the axle to clutch it directly to the hub or to unclutch it therefrom.

5. In combination with a fixed axle having an eccentric extension, a hub mounted upon the body of the axle, open at one end, and provided with clutch-teeth and internal gear-teeth; a combined sprocket and gear, also provided with clutch-teeth; and an eccentric sleeve, carrying the combined sprocket and gear, encircling the eccentric extension of the axle, and movable radially into and out of gear with the hub gear-teeth, and also movable axially to clutch with and unclutch from the hub clutch-teeth.

6. In combination with a fixed axle having an eccentric extension; a hub mounted upon the axle, open at one end, and provided at such open end with internal gear-teeth and with clutch-teeth; an independent sprocket and gear wheel provided with clutch-teeth; and an eccentric sleeve or support for the combined sprocket and gear, mounted upon the eccentric extension of the axle and movable both longitudinally and rotatively thereon, and adapted to carry said combined sprocket and gear into concentric and clutching relation with the open-ended hub, or out of clutching relation and into meshing eccentric relation therewith, according to the adjustment of said support.

7. In combination with a member to be driven, provided with a clutch member; an axle having a main body portion and a portion eccentric thereto; an eccentric sleeve mounted upon the eccentric portion of the axle; a combined sprocket and gear mounted upon the sleeve, provided with a clutch member, and adapted to be thrown into and out of gear with the member to be driven, or to be clutched to or unclutched therefrom; and means for moving the combined sprocket and gear longitudinally of the axle, during the rotation of the sleeve by which it is moved radially.

8. In combination with an axle having an eccentric portion, a hub mounted to turn upon the axle and provided with gear and with clutching teeth; an eccentric sleeve upon the eccentric portion of the axle; a combined sprocket and gear carried by said sleeve and provided with clutching-teeth; and means for rotating the sleeve and for moving the combined sprocket and gear lengthwise of the axle.

9. In combination with an axle B, having a cam-slot $a$, and an eccentric end D; a hub C mounted upon the axle and provided with gear $o$ and clutch-teeth $q$; an eccentric sleeve E provided with pin $b$ and gear or pinion $h$; means for rotating the sleeve; and a sprocket-wheel G mounted upon the sleeve and provided with gear $n$, and clutch-teeth $p$.

10. In combination with an axle B provided with a cam-slot $a$, and an eccentric end portion D; a hub C mounted upon the axle and provided with gear $o$ and clutch-teeth $q$; an eccentric sleeve whose eccentricity is equal to that of the axle end D; a pin $b$ and gear $h$ carried by the sleeve; means for rotating the sleeve; and a sprocket-wheel G provided with gear $n$ and clutch-teeth $p$.

11. In combination with an eccentric axle and a hub; the combined sprocket and gear wheel, adapted to be connected with and disconnected from the hub; the eccentric sleeve; a pinion $h$, and the reciprocating rack-bar F engaging the pinion for actuating the eccentric sleeve.

12. In combination with a supporting-shaft, a driving member loose thereon, provided with gear-teeth and with clutching-teeth; a member to be driven, also loose upon the supporting-shaft, and provided with gear-teeth and with clutching-teeth; and means for moving the driving member on the shaft at right angles to and also in the direction of the length of the shaft; whereby it may be thrown into and out of gear with and unclutched from or clutched to the other member.

13. In combination with a wheel to be driven, provided with clutch-teeth and with gear-teeth; a combined clutch and gear wheel; an eccentric sleeve constituting an axle for said combined clutch and gear wheel; and an eccentric axle for the sleeve; the two eccentric members serving to throw the combined clutch and gear radially into and out of gear with the gear-teeth of the driven wheel, substantially as set forth.

In witness whereof we hereunto set our hands in the presence of two witnesses.

CHARLES E. LIPE.
ALEXANDER T. BROWN.

Witnesses:
J. R. MONTAGUE,
A. A. SCHENCK.